United States Patent
Müller

(10) Patent No.: US 8,961,268 B2
(45) Date of Patent: Feb. 24, 2015

(54) METHOD FOR HARD FINE MACHINING OF THE TOOTH FLANKS OF A GEAR WHEEL

(75) Inventor: Hartmuth Müller, Remscheid (DE)

(73) Assignee: Klingelnberg AG, Zurich (CH)

(*) Notice: Subject to any disclaimer, the term of this patent is extended or adjusted under 35 U.S.C. 154(b) by 476 days.

(21) Appl. No.: 13/503,236

(22) PCT Filed: Oct. 5, 2010

(86) PCT No.: PCT/EP2010/064842
§ 371 (c)(1),
(2), (4) Date: Apr. 20, 2012

(87) PCT Pub. No.: WO2011/047957
PCT Pub. Date: Apr. 28, 2011

(65) Prior Publication Data
US 2012/0208436 A1   Aug. 16, 2012

(30) Foreign Application Priority Data
Oct. 22, 2009   (EP) ..................................... 09173800

(51) Int. Cl.
*B23F 17/00*   (2006.01)
*B24B 19/00*   (2006.01)
(Continued)

(52) U.S. Cl.
CPC .................. *B23F 19/00* (2013.01); *B23F 17/00* (2013.01)
USPC .................................. 451/47; 451/275; 451/5

(58) Field of Classification Search
CPC .................................. B23F 19/00; B23F 17/00
USPC ............. 451/147, 161, 275, 47, 48, 5, 57, 58, 451/900
See application file for complete search history.

(56) References Cited

U.S. PATENT DOCUMENTS 1,858,568 A * 5/1932 Wildhaber ....................... 451/47
2,567,460 A * 9/1951 Aeppli .......................... 451/161
(Continued)

FOREIGN PATENT DOCUMENTS

| DE | 37 34 828 C1 | 1/1989 |
| DE | 198 29 880 A1 | 8/1999 |

(Continued)

OTHER PUBLICATIONS

International Preliminary Report on Patentability for International Application No. PCT/EP2010/064842, issued May 8, 2012.
(Continued)

*Primary Examiner* — Lee D Wilson
*Assistant Examiner* — Tyrone V Hall, Jr.
(74) *Attorney, Agent, or Firm* — McCarter & English LLP

(57) ABSTRACT

The invention relates to a method for hard fine machining of a pre-manufactured flank (11) of a gear wheel by a machine having at least five axes controlled in coordination and one additional tool axis (WA). According to the invention, a rotation-symmetrical tool (20.1) is driven on the machine side such that it is set into a rotation (RA) about the tool axis (WA). In addition, the axes controlled in coordination are actuated such that a straight-lined section of the surface line of the tool (20.1) is guided tangentially along the flank (11) in a generating movement while the tool (20.1) removes material on the pre-manufactured flank (11) by means of the rotation (R1) about the tool axis (WA). The generating movement follows pre-specified movement vectors (E).

12 Claims, 8 Drawing Sheets

(51) Int. Cl.
*B24B 1/00* (2006.01)
*B23F 19/00* (2006.01)

(56) References Cited

U.S. PATENT DOCUMENTS

| | | | | |
|---|---|---|---|---|
| 2,888,784 | A | * | 6/1959 | Cleff .............................. 451/120 |
| 3,324,604 | A | * | 6/1967 | Kendall ........................... 451/48 |
| 3,386,213 | A | * | 6/1968 | Hauser ............................ 451/47 |
| 3,897,656 | A | * | 8/1975 | Muller et al. .................. 451/275 |
| 4,555,871 | A | * | 12/1985 | Bloch et al. ....................... 451/5 |
| 4,565,474 | A | * | 1/1986 | Charles ........................... 409/51 |
| 5,091,861 | A | * | 2/1992 | Geller et al. ................... 700/192 |
| 5,116,173 | A | * | 5/1992 | Goldrich ......................... 409/13 |
| 5,136,522 | A | * | 8/1992 | Loehrke ........................ 700/164 |
| 5,480,343 | A | * | 1/1996 | Pedersen et al. ................ 451/10 |
| 5,634,250 | A | * | 6/1997 | Mihailovic .................... 29/26 A |
| 5,720,584 | A | * | 2/1998 | Sijtstra ............................ 409/12 |
| 2010/0111628 | A1 | * | 5/2010 | Megens et al. .................. 409/26 |
| 2012/0129434 | A1 | * | 5/2012 | Hackman et al. ............... 451/48 |
| 2012/0184187 | A1 | * | 7/2012 | Yanase et al. ................... 451/47 |

FOREIGN PATENT DOCUMENTS

| | | |
|---|---|---|
| DE | 19829880 A1 * | 8/1999 |
| DE | 100 27 011 A1 | 12/2001 |
| DE | 10027011 A1 * | 12/2001 |
| DE | 20 2009 009 138 U1 | 9/2009 |
| NL | 2000617 | 4/2007 |

OTHER PUBLICATIONS

International Search Report for International Application No. PCT/EP2010/064842, mailed Mar. 24, 2011.

* cited by examiner

METHOD FOR HARD FINE MACHINING OF THE TOOTH FLANKS OF A GEAR WHEEL

CROSS-REFERENCE TO RELATED APPLICATIONS

This application is the U.S. National Phase of International Application No. PCT/EP2010/064842, entitled "Method for Hard Fine Machining of the Tooth Flanks of a Gear Wheel", filed on Oct. 5, 2010, which claims priority from European Patent Application No. EP 09 173 800.5, filed Oct. 22, 2009, the disclosures of which are hereby incorporated by reference in their entirety.

FIELD OF THE INVENTION

The subject of the invention is a method for the hard fine machining of a pre-manufactured tooth flank of a gear wheel.

BACKGROUND OF THE INVENTION

In the fabrication of gears, a distinction is typically made between the so called soft machining and the hard machining. The soft machining is carried out before the hardening of the work piece. The hard machining, however, is carried out after the hardening.

After the soft machining, due to the subsequent hardening, deformations due to hardening may result. In order to achieve the desired geometry, contact properties and surface qualities, such gear wheels are thus often machine finished in the hard state.

FIG. 1 shows a schematic representation of an exemplary process flow 100. A general example for the machining of a gear wheel is concerned. Starting from a blank (box 101), the following soft machining steps are carried out in the example shown. For example, a (central) bore hole may be generated by turning (box 102). Then, the blank may be turned over for further machining (box 103). After the turning over, an anew machining by turning may follow (box 104). These steps are optional and are also called preform fabrication here. Other steps or alternative steps may also be carried out within the framework of the preform fabrication. At the end of the preform fabrication, the work piece is called gear blank or work piece blank K1. The step 102 or the steps 102 to 104 may be carried out for example in a so-called pre-machining machine or in several different machines.

Then, the gear cutting follows typically. In the context of a gear cutting machining, a predefined number of tooth spaces is carved out by means of the gear roughing (box 105) at the bevel gear wheel blank K1 in the approximate position and with approximate allowances using a rough machining tool. Then, the optional step of the teeth cutting finishing (box 106) may follow, which is performed using a finishing tool and which provides to the tooth spaces respectively the adjoining tooth flanks the desired shape with the predetermined accuracy by the finishing machining. However, it is also possible to carve out the tooth flanks in only one step (instead of the two steps 105 and 106).

The steps 105 and 106 may, for example, be performed in one and the same machine or machining station. The workpiece blank K1 then does not have to be re-clamped or transferred.

The previous steps are called soft machining, as indicated in FIG. 1.

Subsequently, a heat treatment (box 107) of the pre-fabricated workpiece K2 follows typically. This heat treatment typically does not count anymore to the soft machining. It serves to harden the pre-fabricated workpiece K2. Then, the already mentioned machine finishing (box 108) follows. In the machine finishing, which is also called hard fine machining herein, a hard machining of the tooth system is performed. Then, the gear wheel K3 is completed.

In the hard machining, end mills or ball-shaped head-like millers are employed to some extent today, which are slowly guided over the surfaces of the pre-manufactured tooth flanks to be finished. Investigations show that the surfaces, which have been finished in that way, may in certain circumstances show explicit processing traces and may have a bad contact pattern. This is the case in particular, when insufficient time is available for the finishing and/or when the tool is guided too quickly over the tooth flanks to be finished. Hydrodynamical lubrication problems may also result, for example, when two gear wheels, which have been finished in that way, are employed as a gear pair.

It is thus an object of the present invention to provide a method for hard fine machining of a pre-manufactured tooth flank of a gear wheel, which provides for a better tooth contact pattern or better surface properties of the tooth flanks and which features a good productivity.

SUMMARY OF THE INVENTION

This object is solved according to the present invention by a method for hard fine machining of a pre-manufactured tooth flank. This method is employed on a machine which comprises at least five axes controlled in coordination and one additional tool axis. According to the invention, a rotationally symmetrical tool, preferably an end mill or a grinding rod, is set in a rotation about the tool axis. One or more of the five axes controlled in coordination are controlled such that a rectilinear section of the enveloping line of the tool is guided in a generation motion tangentially in several traces along the tooth flank, while the cylindrical tool takes off material from the pre-manufactured tooth flank due to the rotation about the tool axis.

An embodiment is particularly preferred, in which the generation motion follows traces running slightly curved, wherein these traces are approximate to the virtual traces of the cutters of a milling head, which would be formed when generating the corresponding tooth flank by hobbing using a milling head.

Preferably, the tool is guided along traces, which correspond to the so-called rolling ISO lines or which are approximated to these rolling ISO lines.

The method according to the invention is designed in particular for the machining of tooth flanks subsequent to a hardening process, thus in the hardened state. The tools, which are employed, have to be selected accordingly. The according method is therefore called hard machining. Since the re-working respectively machine finishing of already pre-manufactured tooth flanks is concerned here, the method is also called hard fine machining.

The most important advantage of the method according to the invention is seen in that a complete removal of the deformations due to hardening remaining from the heat treatment is ensured, whereby exactly defined bearing properties and outstanding surface qualities can be achieved, which has a positive effect on the operating life and quiet running of the gear wheels that have been machined accordingly. The application of the present invention may also have a positive impact on the hydrodynamical lubrication, when two gear wheels, which have been machine finished according to the invention, are paired with each other.

BRIEF DESCRIPTION OF THE DRAWINGS

Further details and advantages of the invention are described in the following with reference to embodiments and with reference to the drawings It shows.

DETAILED DESCRIPTION OF EMBODIMENTS OF THE INVENTION

In relation with the present description, terms are used, which also find use in specialized publications and patents. However, it is noted that the use of these terms is only to serve a better comprehension. The inventive idea and the protective scope of the claims shall not be limited in respect of the interpretation by the specific choice of the terms. The invention can be transferred without further ado to other systems of terminology and/or areas of expertise. In other areas of expertise, the terms are to be applied analogously.

Figure 1:
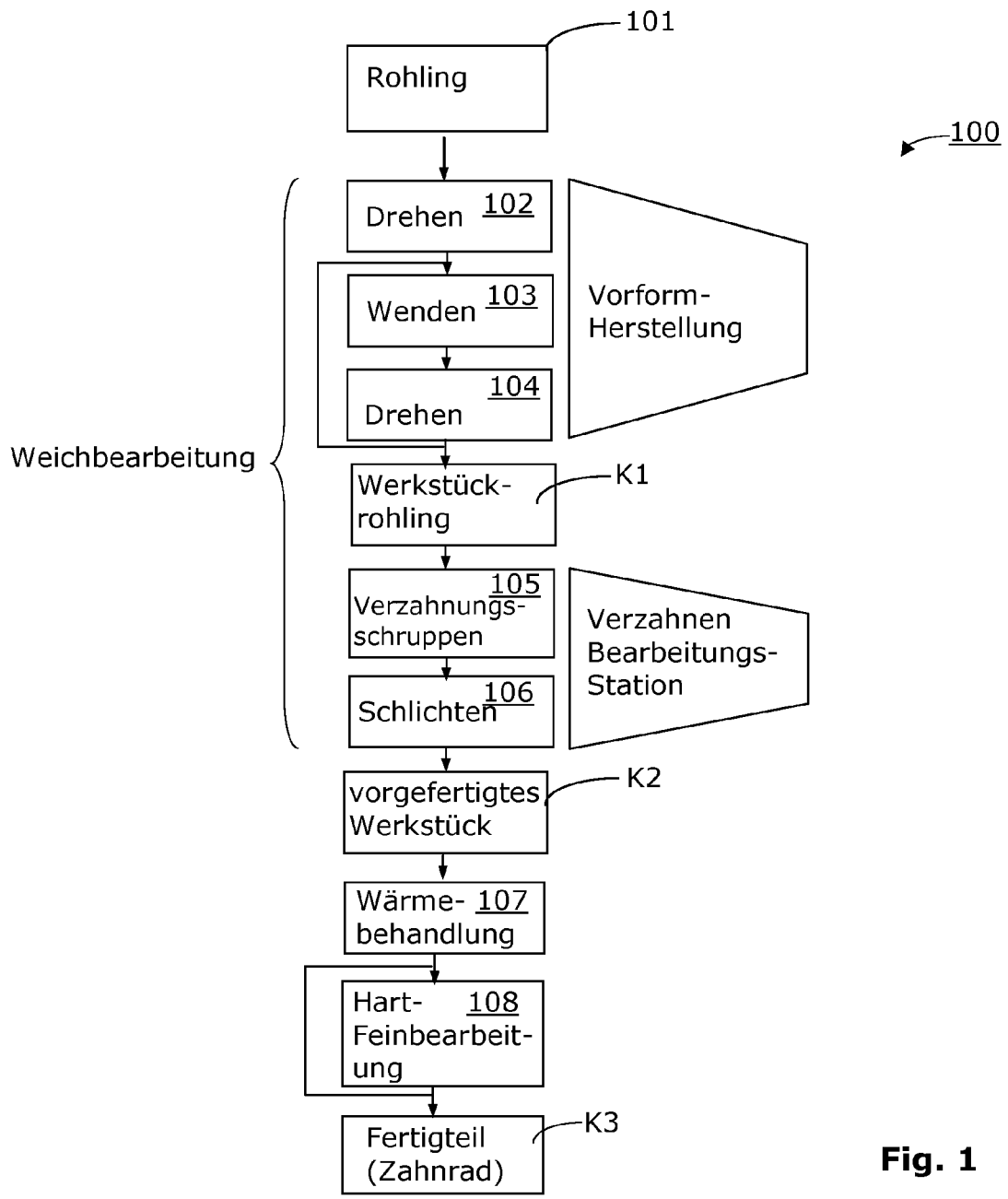
FIG. 1 is a general scheme for the machining of gear wheels.
Figure 2A:
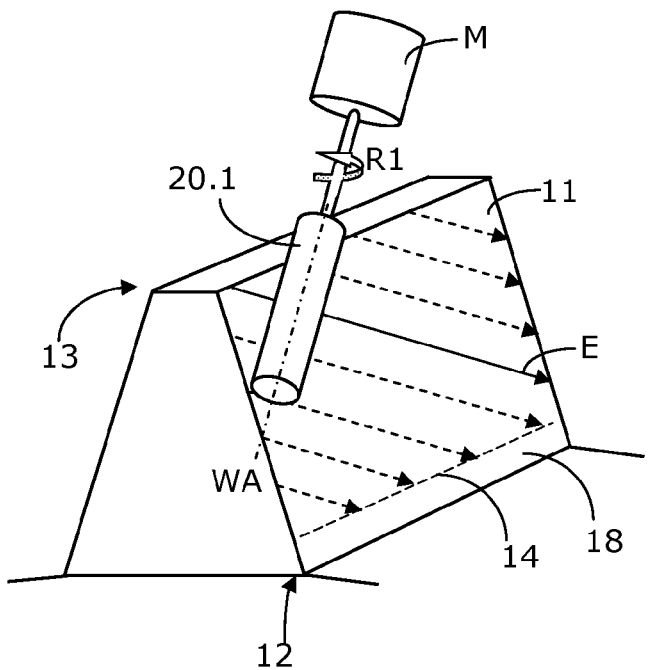
FIG. 2A is a perspective view of the tooth of a gear wheel and a tool guided according to the invention in schematic representation.

The method according to the invention for hard fine machining of a pre-manufactured tooth flank 11 of a gear wheel 10 is described in the following with reference to the FIGS. 2A and 2B. FIG. 2A shows a simplyfied perspective view of a single tooth of a straight-toothed gear wheel, i.e. it does not have any curvature of the tooth flank line. It concerns a strongly schematized representation of a tooth having a straight tooth profile. In practice, such teeth often have a tooth profile (e.g. an involute tooth profile), which is curvilinear. The tooth has a right-hand side tooth flank 11, which is visible here. The tooth has a constant tooth height. The left-hand side (rearward) tooth flank is not visible. In FIG. 2A, it can be seen that a rotationally symmetrical tool 20.1 (having a cylindrical base body here), preferably a cylindric miller or grinding rod, is set in a rotation R1 about the tool axis WA. This rotation R1 is generated by a motor M, which sits in a spindle or in the machine 100 (not shown), for example. The motor M is shown strongly simplified here. The situation shown in FIG. 2A concerning a straight profile concerns a special case, in which the tool 20.1 contacts the flank 11 along the entire length, while in the normal case of a curved profile the tool 20.1 contacts [the surface] only along a section, the length of which depends on the set-in relative to the flank.

The machine 100 is a machine (as e.g. shown in FIG. 12), which comprises at least five axes that are controlled in coordination and which has an additional tool axis WA. One or more of the five axes controlled in coordination are now controlled (e.g. by a NC-control S of the machine 100) such that a or rectilinear enveloping line (also called rectilinear length section herein) of the tool 20.1 having a cylindrical base body (herein also called cylindrical tool 20.1) is guided in a generation motion tangentially along the tooth flank 11. Details in this respect can be taken e.g. from the schematic FIGS. 3 to 6 or the FIGS. 7A, 7B. The generation motion is represented in the figures by a host of vectors E. The generation motion is performed, while the rotationally symmetrical tool 20.1 rotates about the tool axis WA. Material is taken off from the pre-manufactured tooth flank 11 due to the rotation R1 about the tool axis WA, i.e. a machining finishing of the tooth flank 11 is yielded. Since respectively at least a rectilinear length section of the tool 20.1 abuts against the face of the tooth flank 11 to be machined, a piece- or sectionwise line contact results in the machining. The size of the piece- or sectionwise line contact is determined by the lining with respect to the flank, by the processing steps which have preceded (e.g. the teeth cutting hobbing using a hob) and by the shape of the base body of the tool. The preceding machining steps always have an influence on the surface condition of the tooth flank. A section through the tooth flank is in principal always a polygonal line due to the preceding machining steps, wherein the distance of the individual points of the polygonal line is determined by the feed (in hobbing by the rolling feed). If a so-called profile grinding (shape grinding) is utilized, then, however, it must not concern a polygonal line.

Figure 2B:
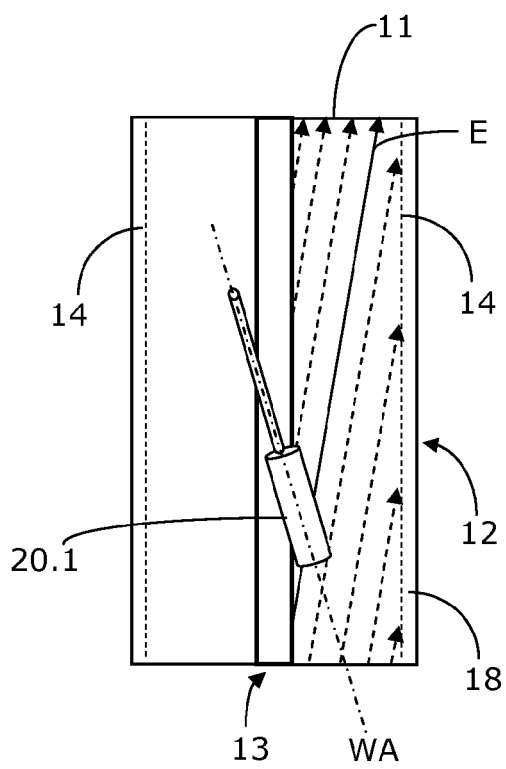
FIG. 2B is a top view of the tooth and the tool according to FIG. 2A in schematic representation.

In FIGS. 2A and 2B, the generation motions are represented by the vectors E, which extend obliquely along the tooth flank 11. The continuous vector E shows the current moving direction and generation motion of the tool 20.1. The other traces of generation motions are represented by the dashed vectors.

Figure 7A:
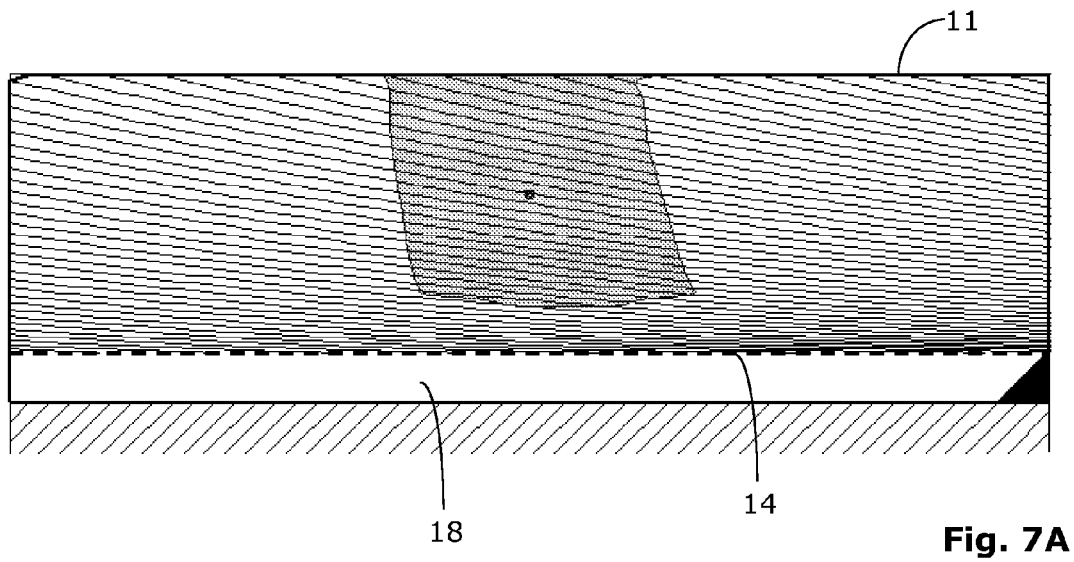
FIG. 7A is a schematic view of a spur-toothed conical gear wheel having a constant tooth height, wherein the rolling ISO lines are represented.
Figure 7B:
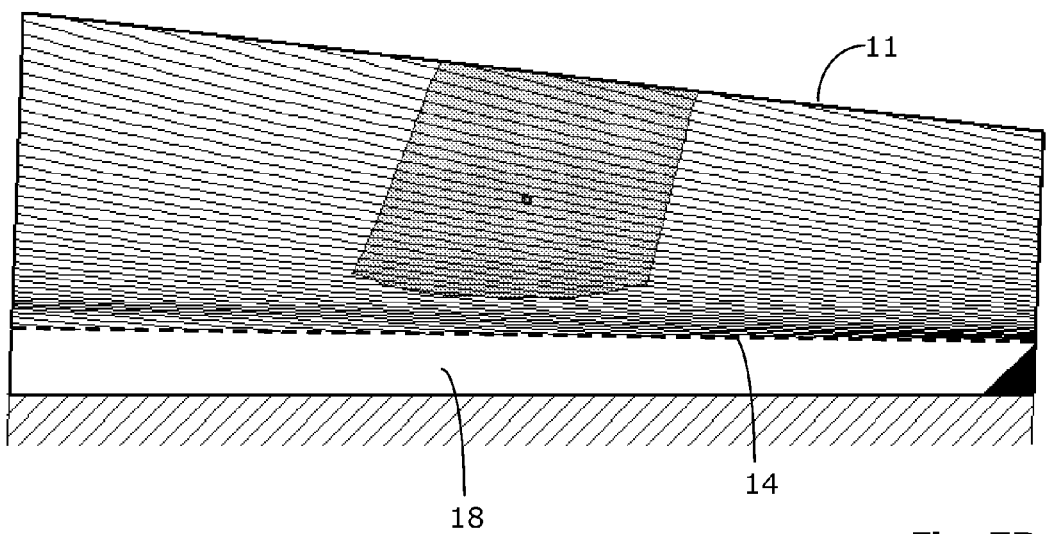
FIG. 7B is a schematic view of a spur-toothed conical gear wheel having a variable tooth height, wherein the rolling ISO lines are represented.

It is noted that in practice the traces of generation motions lie significantly closer beside each other than is shown here in the FIGS. 2A, 2B, 3, 4, 5, 6 and 11 (i.e. the distances A are significantly smaller, as can be seen e.g. in the FIGS. 7A and 7B). In addition, the course and the shape of the traces of generation motions are preferably analogous to the rolling ISO lines, which would result in a rolling machining, as is shown e.g. in the FIGS. 7A and 7B. The rolling ISO lines concern connection lines of points, which have been generated using the same rolling angle.

Now, the according course of motion of the tool 20.1 arises as follows. A machine setting is chosen, in which the axis WA is slanted with respect to the idealized tooth flank 11, such that at least a short rectilinear length section of the tool 20.1 lies tangentially to the tooth flank 11. For a truncated-cone-shaped tool 20.2 (i.e. for a tool 20.2 having a truncated cone-shaped base body e.g. according to FIG. 9), an according different angle setting may be chosen. When using a tool 20.2, the lining angle may correspond to the angle between the enveloping line 21 of the truncated cone and the axis of the cone, which corresponds to the tool axis WA here.

Figure 8:
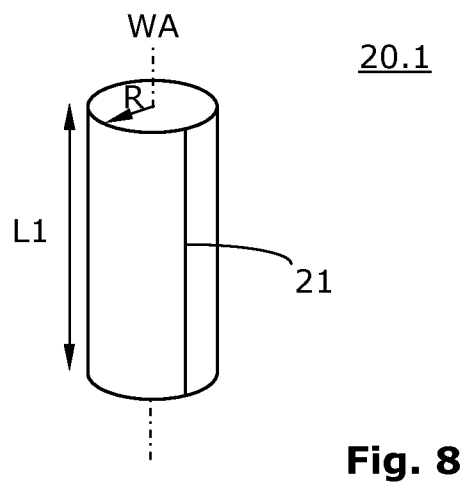
FIG. 8 is a perspective view of the base body of a tool according to the invention having a cylindrical base form in schematic representation.

Tools 20 are particularly preferred, the rectilinear section of which is relatively long in relation to the diameter. Preferably, the ratio between the effective operative length L1 and the radius R is greater than 5, i.e. L/R>5. Thus, a tool 20.1 having a lengthy slender base body according to FIG. 8 is concerned preferably. Such a tool has the advantage that it can be inserted in the tooth gap between neighboring teeth without problem, if the lining angle is chosen sufficiently steep, i.e. if the tool 20.1 is guided rather steep, as indicated e.g. in FIG. 4.

Figure 3:
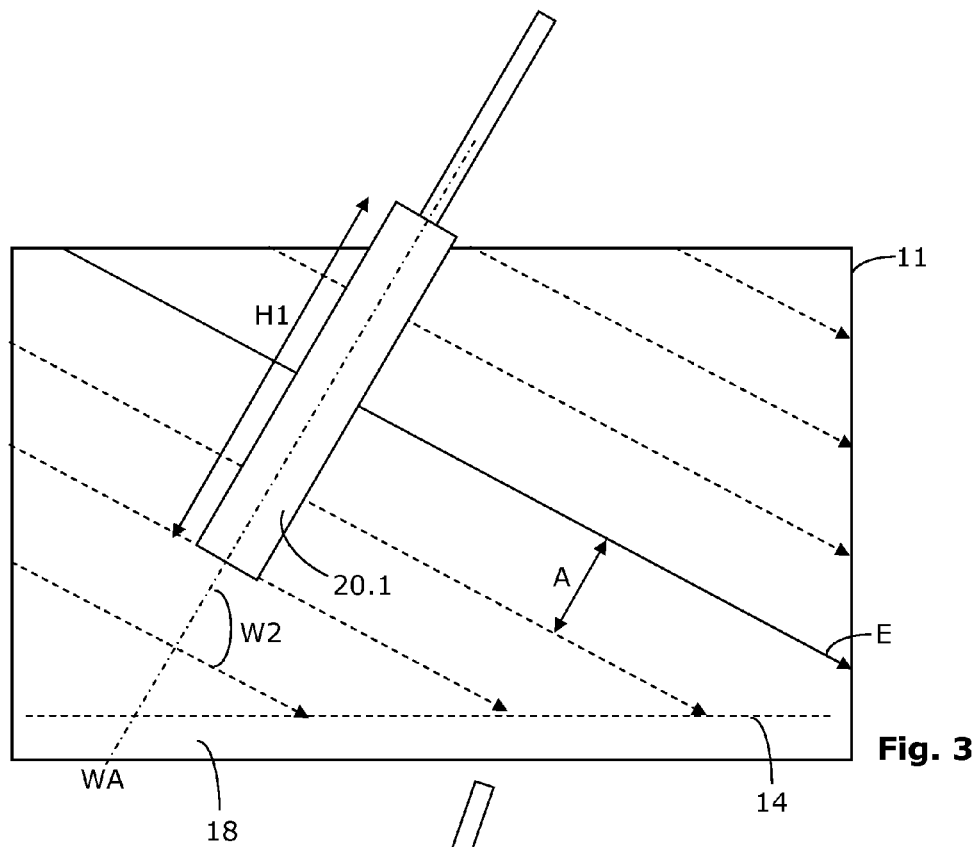
FIG. 3 is a schematic view of the tooth of a gear wheel and a tool guided according to the invention in schematic representation, wherein the tool is guided such that its rotation axis is perpendicular to the generation traces.

Depending on the type of the machine setting, the distances A (see FIGS. 2A, 2B, 3, 4, 5, 6 and 11) of adjoining generation traces may have a somewhat greater or smaller distance A. Preferably, the distance A of two directly neighboring generation traces (respectively the corresponding vectors E) is smaller than the effective operative length of the enveloping line of the tool 20. In FIG. 3 a situation is shown, in which the enveloping line of the base body of the tool 20.1 is an ideal cylinder and in which the effective operative length L1 of the enveloping line corresponds to the height H1 of the cylinder of the cylindric tool 20.1, i.e. L1=H1. The distance A amounts preferably to between 0.2*L1 and 0.8*L1. These specifications only hold in case the tooth profile is rectilinear and in case the tooth flank line is rectilinear. In the example shown in FIG. 3, the distance A amounts to approximately 0.25*L1.

Not only the effective operative length L1 of the enveloping line and the tooth flank line as well as the tooth profile may have an influence on the distance A. The choice of the lining angle W2 may also be taken into account in the definition of the distance A. Preferably, the following rule is applied. If the lining angle W2 is greater or less than 90 degree, than the distance A is scaled down proportionally to the sine of the lining angle W2. The following approach may hold for example: A=L1*(sin W2).

These mathematical relationships, in case they are applied, lead to advantageous results with respect to the surface quality on one hand and the required machining time on the other hand. The corresponding rules are, however, optional. It is also possible to operate a machine 100 with constant distances A. It is also possible that the distance A is a function of the current position of the tool 20 on the tooth flank 11. The vectors E, which represent the generation motions, may be lines that extend in parallel (i.e. the distance A is the same everywhere). The vectors E may, however, also be curvilinear and they must not be parallel (analogously to the rolling ISO lines).

The tooth geometry is taken into account when determining the generation motions, respectively the according 3-dimensional motion paths, along which the tool 20 is moved by an according interplay of the axes of the machine 100. Beside the tooth flank line and the course of the profile, flank modificatons and other aspects, which determine the flank 11 in its totality in 3-dimensional space, are also taken into account. If the flank is, for example, convex, then the 3-dimensional motion paths (here represented by the vectors E) must be adapted accordingly on the side of the machine. According adaptations are also required e.g. for teeth having a variable tooth height and/or for the teeth of a helical- or spiral-toothed gear wheel.

The smaller the distance A, the more precisely the surface of the tooth flank 11 may be machine finished. A close arrangement of the generation motions (which means the same as a small distance A) means, however, that the tool must be guided along the surface more often than for a greater distance A of the generation motions. The more often the tool 20 must be guided along, the longer the machine finishing time.

Figure 4:
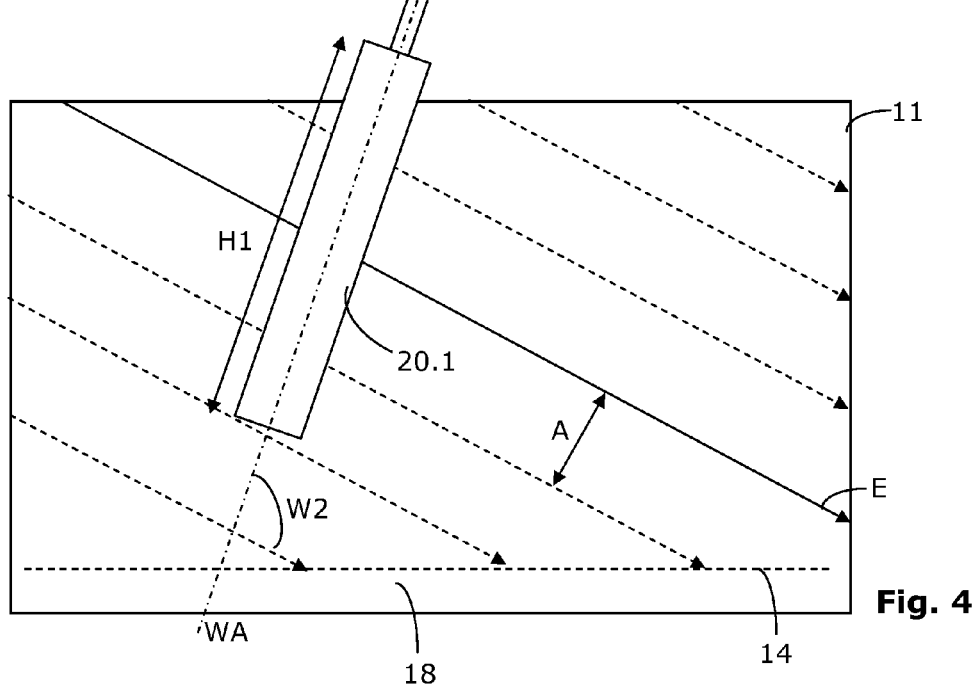
FIG. 4 is a schematic view of the tooth of a gear wheel and a tool guided according to the invention in schematic representation, wherein the tool is guided in a pushing way such that its rotation axis encloses an angle to the generation traces, which angle is greater than 90 degrees.
Figure 5:
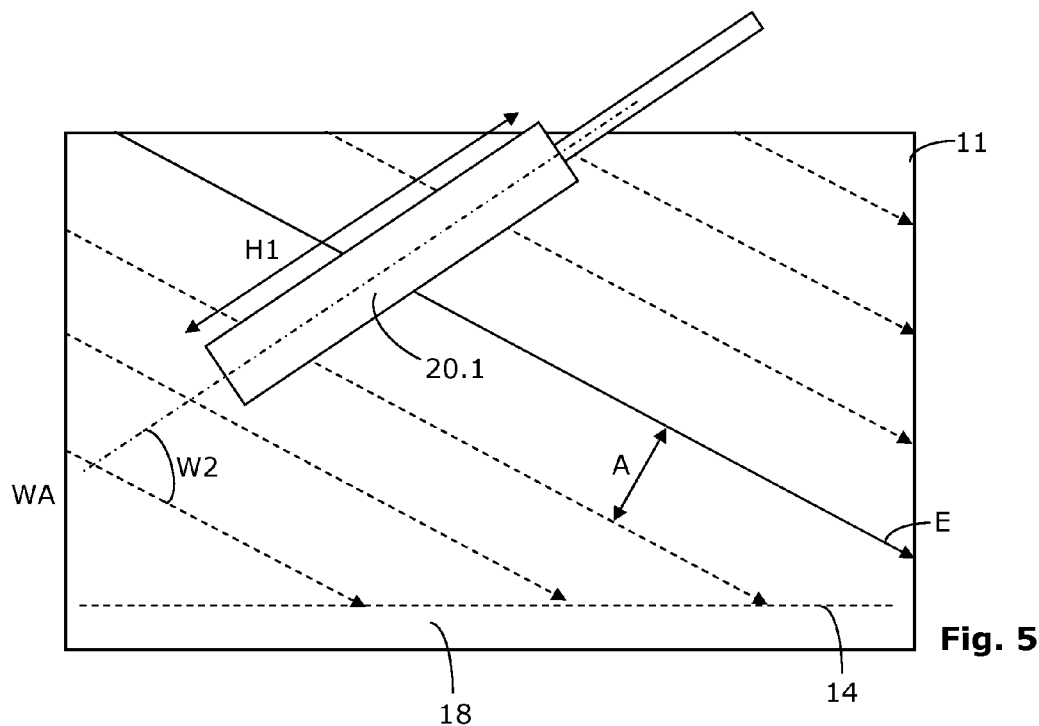
FIG. 5 is a schematic view of the tooth of a gear wheel and a tool guided according to the invention in a schematic representation, wherein the tool is guided in a pulling way such that its rotation axis encloses an angle to the generation traces, which angle is less than 90 degrees.
Figure 6:
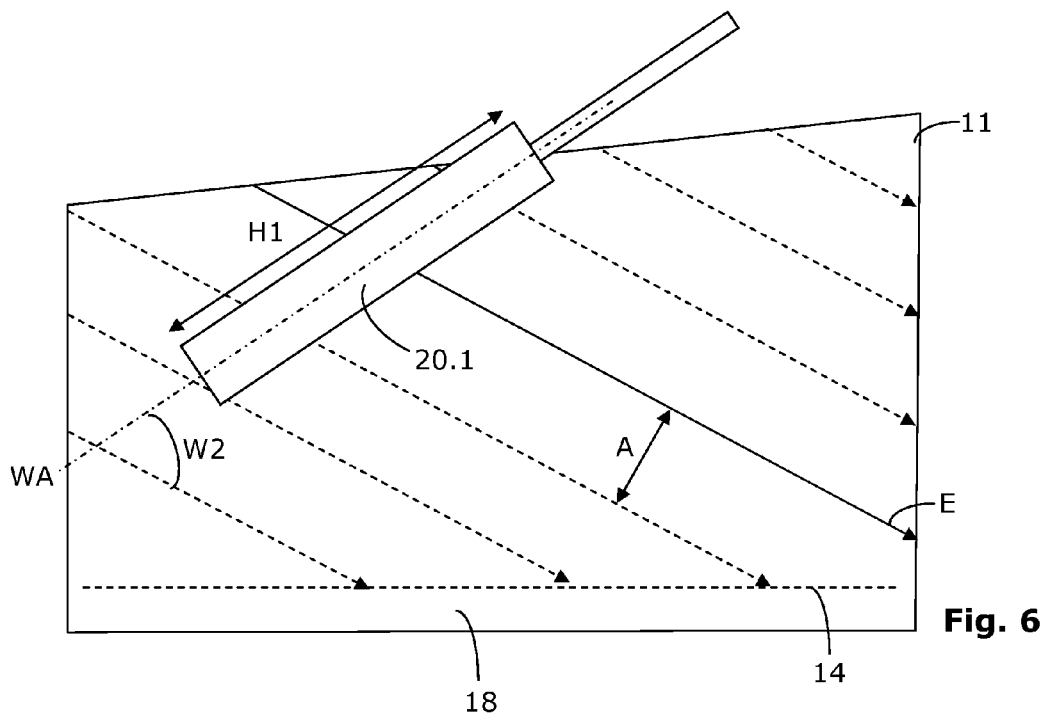
FIG. 6 is a schematic view of a gear wheel having a variable tooth height and a tool guided according to the invention in schematic representation, wherein the tool is guided in a pulling way.

Beside the prescription of the lining angle of the tool axis WA, which depends among others from the shape of the base body of the tool 20, it may also be prescribed, whether the tool 20 is guided across the tooth flank 11 to be machined in a perpendicular orientation (as shown in FIG. 3), in a pushing orientation (as shown in FIG. 4) or in a pulling orientation (as shown in FIG. 5). For the perpendicular orientation according to FIG. 3, the lining angle W2 amounts to 90 degree, for the pushing orientation according to FIG. 4, the lining angle W2 amounts to between 90 and 135 degree, and for the pulling orientation according to FIG. 5, the lining angle W2 amounts to between 90 and 45 degree.

In the figures it is indicated by a dashed line 14 that the tooth flank has a portion, which is not finished with the tool 20, in the area of the foot, i.e. close to the tooth root 12. The dashed line 14 defines the transition to the tooth root area 18. This transition is blurred.

The teeth shown in the FIGS. 2A, 2B, 3, 4, 5, 7A and 11 all have a constant tooth height. The invention may, however, be applied without problems also to other more complicated tooth flanks. In general, the tooth flanks are curvilinear in the direction of the longitudinal line of the flanks and in the direction of the profile, as stated. The NC-control S must then be programmed such that the vectors E are adapted accordingly.

The machine 100 comprises a control S, which generates the control signal for tangentially lining the tool 20; 20.1, 20.2 and for performing the generation motion.

The invention may particularly advantageously be employed for the machine finishing of the tooth flanks of bevel gears. In FIG. 7A, the flank 11 of a spur-toothed bevel gear having a constant tooth height is shown. In FIG. 7B, the flank of a spur-toothed bevel gear having a variable tooth height is shown. The foot cone angle is smaller than the head cone angle here. What has been described before applies analogously here.

The invention may be applied to gear wheels having a constant or having variable tooth height. It may generally be applied also to spur-toothed, helical-toothed and spiral-toothed gear wheels.

In a particularly preferred embodiment of the invention, the generation motion follows rectilinear or slightly curvilinear vectors E, which are preferably extending parallel to each other. These vectors E are preferably determined calculatively such that they approximate e.g. the virtual blade traces of a bar cutter head (whereby they do not necessarily have to extend in parallel then), which traces would be formed when generating the corresponding tooth flank by means of hobbing. When hobbing, the bar cutter head does not only perform a rotational movement about its rotation axis (called cutter head axis), but it is also guided about a rolling swaying axis. The rolling swaying axis corresponds to the crown gear axis of the virtual crown gear, which is involved in a mathematical definition of the corresponding bevel gear.

In mathematics, surfaces are called conjugated surfaces, if they touch each other along a line. According to the invention, the tool 20 is always guided along the tooth flank 11, which is carried out by a suitable control of the axes of the machine 100 in that at least a respective short section (herein called the effective operative length L1) of the enveloping line of the rotationally symmetrical tool 20 is conjugated to a short section of the flank surface. By the tangentially guiding of the tool 20 along the flank surface, the conjugation is ensured. It is by this conjunction that it comes to a cutting machine finishing in the very range of the effective operative length L1 of the tool 20. In a microscopic view of a tooth flank 11 that is machine finished according to the invention, there results a flank surface, which may be described as a polygonal line in a section perpendicular to the vectors E of the generation motion traces. After the machining with the tool 20 in the manner just described, a polygonal line P results, which is composed of plural rectilinear line segments and/or curvilinear sections.

Figure 10:
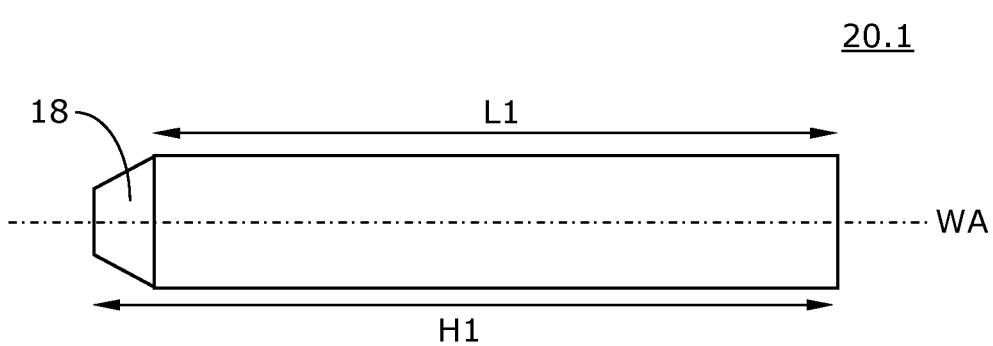
FIG. 10 is a view of a further tool according to the invention having a cylindrical base body in schematic representation.

A schematic view of another tool 20.1 having an elongated cylindrical base body is shown in FIG. 10. This tool 20.1 has a height H1. The effective operative length L1 is shorter, because the head area 18 of the tool is retracted in the form of a truncated cone or it has a head chamfer. Analogously, also a truncated-cone-shaped tool 20.2 may of course have a height H1, which is greater than the effective operative length L1.

Figure 9:
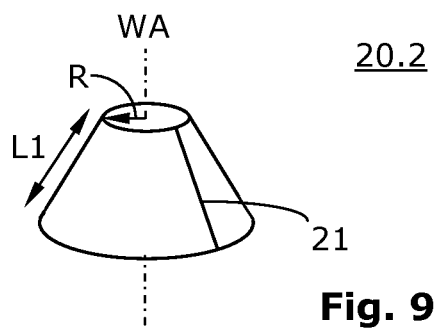
FIG. 9 is a perspective view of a tool according to the invention having a truncated-cone-shaped base body in schematic representation.

The term rotationally symmetrical tool 20 is used here to define a tool 20, the base body of which has either a circular cylindrical shape (see e.g. FIG. 8) or a form of a truncated cone (see e.g. FIG. 9). Circular cylindrical tools 20.1 are shown in the FIGS. 2A, 2B, 3, 4, 5, 6, 8, 10 and 11. A tool 20.2 having the form of a truncated cone is shown in FIG. 9. The description of the embodiments of the FIGS. 2A, 2B, 3, 4, 5, 6, 8, 10 and 11 may correspondingly be applied to the truncated-cone-shaped tool 20.2, whereby only the lining angle must be selected according to the cone angle of the tool 20.2.

Figure 11:
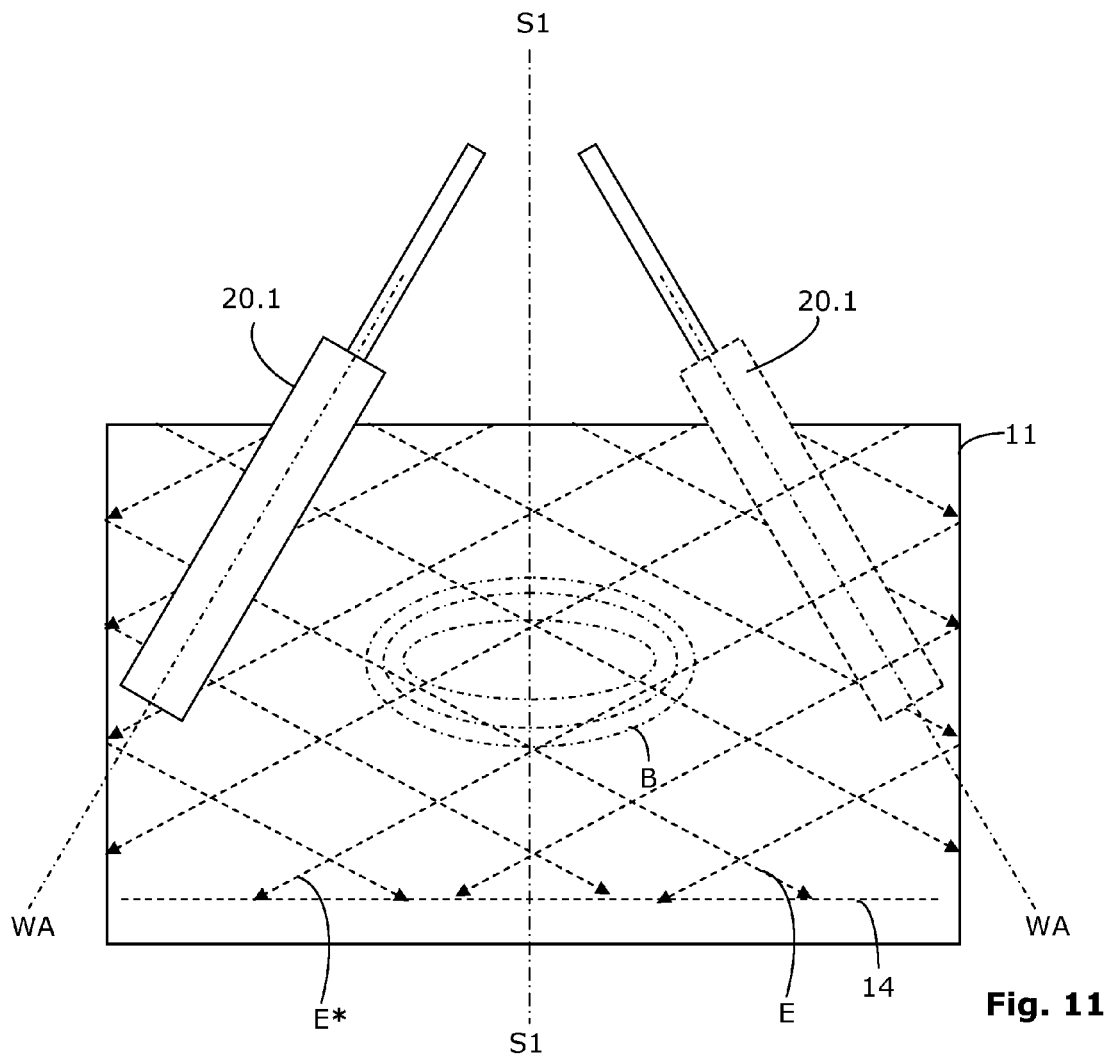
FIG. 11 is a front view of a convex tooth of a spur-toothed gear wheel and a tool guided according to the invention in a schematic representation, wherein the tool is guided crosswise.

For tooth flanks 11, which have for example a crowning B, the tool 20 is preferably guided along vectors E that intersect each other. This principle is indicated in FIG. 11. The crowning B is indicated by ellipses in FIG. 11. The tool 20 may be flapped along a mirror plane S1-S1 before it is guided along vectors E*, which intersect the other vectors E.

The outcome of this are better surface properties, but at the same time also the machine finishing time gets longer.

Herein, rotationally symmetrical tools are mainly concerned, which have a rotational body (rotationally symmetrical base body), the enveloping line of which has been generated by a rectilinear line 21 (called generatrix). Instead of a truncated cone, a hyperboloid may also be employed. A section of the tool abuts at least partially tangentially on the workpiece to be machined during the machining.

Milling tools 20 are preferably employed in the different embodiments. Herein, milling refers to the cutting machining of metals. The tools 20 may concern milling tools, which are employed abradantly, or they may concern milling tools, which comprise cutting edges or cutting blades for scraping off chips.

According to the invention, tools 20 are preferably employed, which have been designed especially for the cutting machining of hardened metals.

The machining movement that is required for generating or scraping off chips is generated by rotating the tool 20 with respect to the pre-manufactured tooth flank 11. The feed motion (in the direction of the vectors E) that is required for the profiling is generated by a relative movement of the tool 20 with respect to the tooth flank 11. The NC-controlled axes of the machine 100 provide for this relative movement.

According to the invention, the tool 20 may stand in a climb cutting state or in a state of cutting against the feed. In the climb cutting state, the blade edge/s of the rotating tool 20, or the circumferential surface of the tool 20, which is overlaid with grinding material, move/s in the meshing sector in the direction of the vector E of the feed motion. In the state of cutting against the feed, they move in the meshing sector against the direction of the vector E of the feed motion.

According to the invention, a rotationally driven, rotationally symmetrical tool is employed. Herein, the tool axis WA is movable about plural axes with respect to the pre-manufactured and hardened workpiece K2. An according control (preferably an NC-control S) is conceived for coupling the corresponding movements of the axes. In result, the tool 20 is guided along programmed motion traces.

Figure 12:
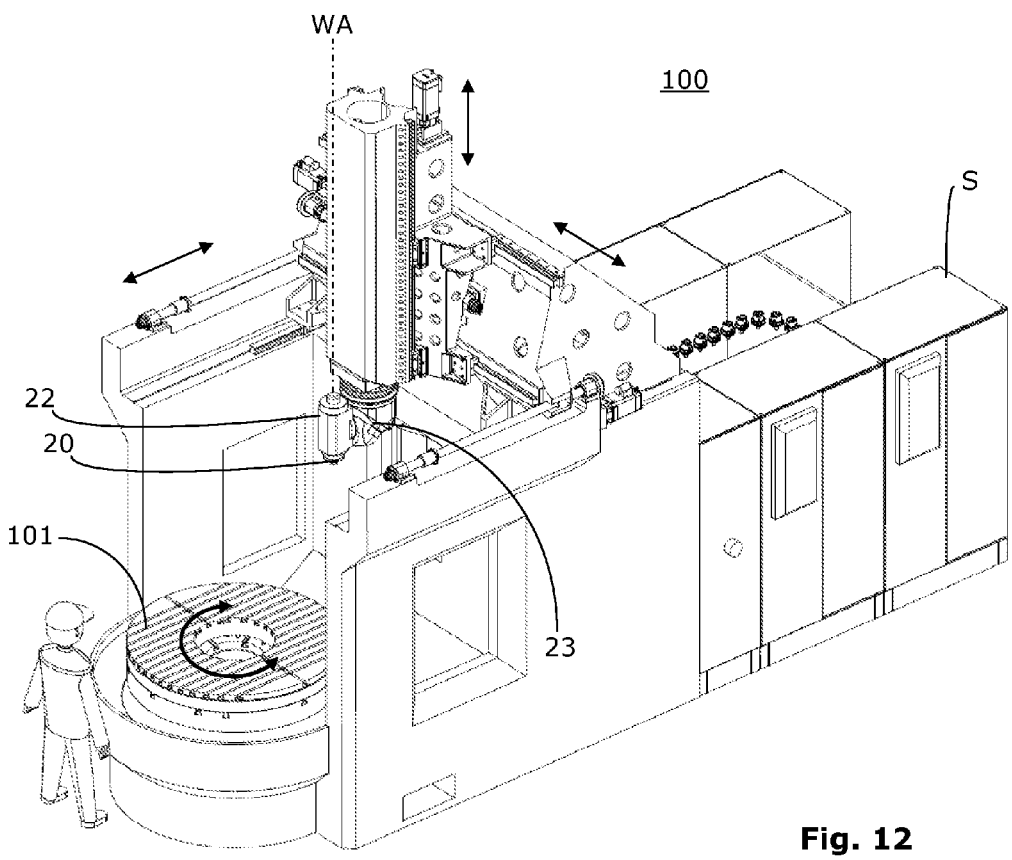
FIG. 12 is a perspective view of a portal machine, on which the invention may be employed.

FIG. 12 shows a perspective view of a portal machine 100, on which the invention may be employed. This machine 100 is particularly designed for the fine machine finishing of gear wheels having a big module. The gear wheel (not shown) to be machine finished is positioned on a workpiece table. The machine 100 has five NC-controlled axes. In addition, it comprises a spindle 22 comprising the tool 20, which rotates about an additional tool axis WA. In the snapshot shown in FIG. 12, the tool axis WA extends vertically. The tool spindle 22 may be turned about a horizontal axis and may be displaced upward and downward parallel to a vertical axis. The machine 100 comprises three linear axes (indicated by rectilinear double arrows) and a first rotation axis of the rotary table 101. In addition, a swiveling of a spindle 22 may be carried out through a rotatory motion using a conical washer 23. Details on an according interface can be taken from a parallel European patent application of the applicant, which has been filed on 10 Sep. 2009, under the number EP 09 169 933.0.

What is claimed is:

1. A method comprising hard fine machining a pre-manufactured tooth flank of a gear wheel using a machine having at least five axes controlled in coordination and an additional tool axis, said machining step further comprising:
   driving a rotationally symmetrical tool in rotation about the tool axis,
   controlling at least one of the five coordinately controlled axes such that at least one short rectilinear section of an enveloping line of the tool is guided in a generation motion tangentially along the tooth flank, while the tool scrapes off material from the pre-manufactured tooth flank due to the rotation thereof about the tool axis, wherein the generation motion follows predetermined motion vectors, that extend slightly curvilinear and are approximated to virtual cutter traces of a cutter head formed when machining the tooth flank by hobbing.

2. A method according to claim 1, wherein the machine comprises a control unit adapted to generate control signals that guide the tool tangentially in engagement with a surface of the tooth flank to be machined and move the tool in the generation motion.

3. A method according to claim 1, wherein the tool comprises a cylindrical base body.

4. A method according to claim 1, wherein the tool comprises a truncated-cone-shaped base body and wherein the step of tangentially guiding the tool comprises using a blade angle of the tool axis corresponding to a cone angle of the tool.

5. A method according to claim 1, further comprising setting a cutting speed of the tool based on a revolution speed of rotation of the tool about the tool axis.

6. A method according to claim 1, further comprising setting a productivity based on a speed of a feed motion by which the tool is guided along the tooth flank.

7. A method according to claim 1, further comprising setting a surface quality of the tooth flank based on a speed of a feed motion by which the tool is guided along the tooth flank, and a distance between neighboring motion vectors.

8. A method according to claim 1, further comprising setting a machining accuracy based on a speed of a feed motion by which the tool is guided along the tooth flank, and a distance between neighboring motion vectors.

9. A method according to claim 1, wherein the motion vectors are substantially parallel with respect to each other.

10. A method according to claim 1, wherein the virtual cutter traces comprise rolling contour lines.

11. A method according to claim 2, wherein the tool comprises a cylindrical base body.

12. A method according to claim 2, wherein the tool comprises a truncated-cone-shaped base body and wherein the step of tangentially guiding the tool comprises using a blade angle of the tool axis corresponding to a cone angle of the tool.

* * * * *